J. M. AHLGREN.
STORAGE BATTERY.
APPLICATION FILED OCT. 6, 1917.
1,259,193.
Patented Mar. 12, 1918.
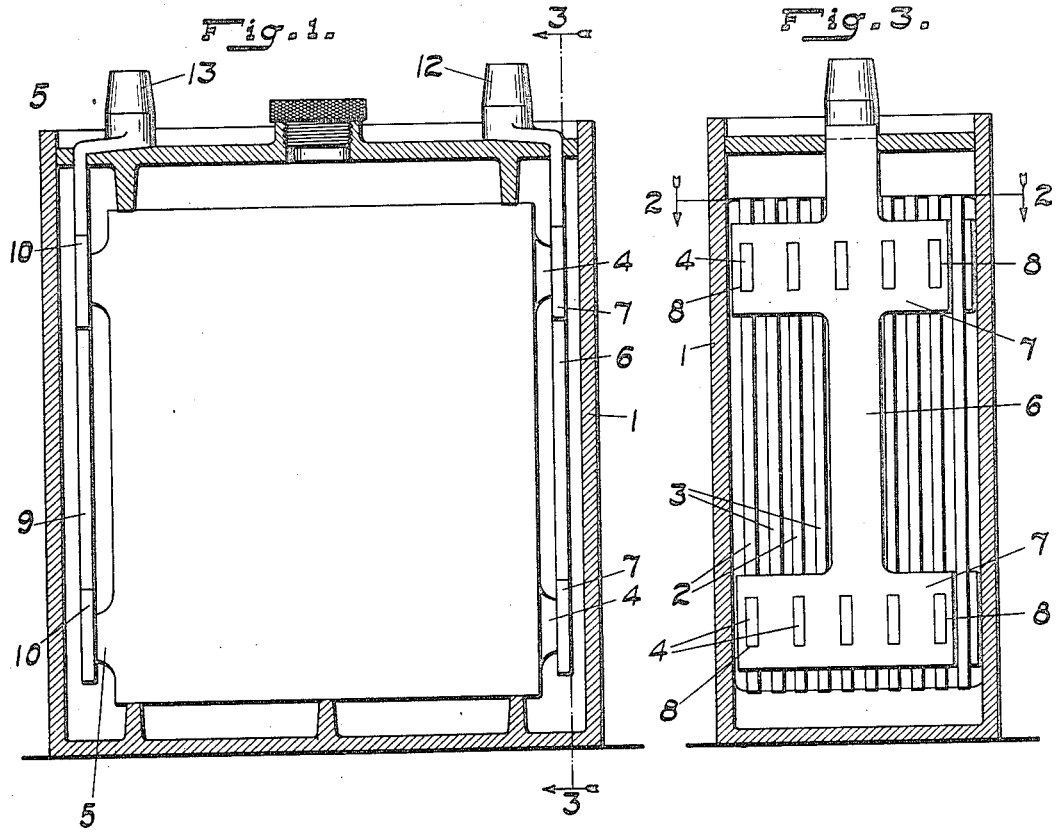
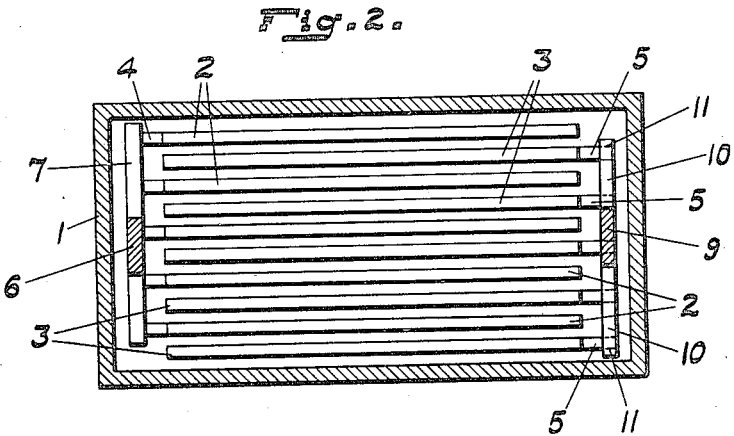
WITNESS.
Walter H. Troemel.
INVENTOR
John M. Ahlgren
BY
Bradford Boolittle
ATTORNEYS

UNITED STATES PATENT OFFICE.

JOHN M. AHLGREN, OF INDIANAPOLIS, INDIANA, ASSIGNOR OF ONE-THIRD TO OMAR M. POLK AND ONE-THIRD TO CLAUDE STANLEY, BOTH OF NEWCASTLE, INDIANA.

STORAGE BATTERY.

1,259,193.          Specification of Letters Patent.      Patented Mar. 12, 1918.

Application filed October 6, 1917. Serial No. 195,071.

*To all whom it may concern:*

Be it known that I, JOHN M. AHLGREN, a citizen of the United States, residing at Indianapolis, Marion county, and State of Indiana, have invented and discovered certain new and useful Improvements in Storage Batteries, of which the following is a specification.

My invention relates to storage batteries and its objects are to obtain an equal distribution of current to and from the plates and by the same construction accomplishing this end, to prevent buckling of the plates.

With these objects in view, my invention is embodied in preferable form in the construction and arrangement hereinafter described and illustrated in the accompanying drawings.

In these drawings, Figure 1 is a vertical, longitudinal section through a battery cell; Fig. 2, a plan view, and Fig. 3, a section at right angles to Fig. 1.

Referring to the drawings, 1 designates the wall of a battery jar, 2 the positive plates therein, and 3 the negative plates. Each of the positive plates is provided at one end thereof on its vertical edge with laterally projecting terminal lugs 4, spaced apart vertically and separated from the top and bottom of the edges respectively, whereby the current is equally distributed throughout the plate with the result of tending to prevent buckling, avoiding the collection of gases at the bottom of the cell and providing a wider path for the current.

At the opposite ends of the cell each of the negative plates 3 is provided with terminal lugs 5 on its vertical edge and spaced apart vertically and corresponding in position to the lugs 4.

In the cell at the positive terminal end thereof is mounted a vertical bus-bar member 6 consisting of a lead strip having upper and lower cross arms 7 each provided with sockets 8 adapted to be respectively engaged by the upper and lower series of positive plate lugs 4, which lugs after their insertion into the sockets are adapted to be permanently connected to the strip by welding or other suitable means of connection. A similar lead bus-bar strip 9 having cross bars 10 and sockets 11 mounted in the other end of the cell engages the lugs 5 of the negative plates. These strips afford a wide path for the current to pass to and from the plates and serve to distribute the current equally to the upper and lower parts thereof, and they also constitute confining and retaining means which serve to rigidly maintain the plates in shape and prevent buckling thereof. The bus-bar members are provided with exterior terminal projections 12 and 13 respectively, to which the connecting wires or straps of the cells are suitably secured.

With the arrangement above described a battery is provided in which the angularity of the lines of current flow is decreased, a more even distribution of current over the plates provided, a wide path for the current obtained and the plates held rigidly in position and buckling thus prevented.

Having thus described my invention, what I claim is:—

1. In a storage battery, in combination with the positive and negative plates thereof, the plates of said sets being provided at opposite ends of the cell along their vertical edges with a plurality of vertically spaced terminal lugs, and vertical bus-bar conductive members at the ends of the plates socketed to receive said lugs and carrying the terminals for the respective sets to which the connecting straps of the cells are adapted to be secured.

2. In a storage battery, in combination with the positive and negative plates thereof, the positive plates at one end of the cell being provided with a series of laterally projecting lugs along their vertical edges adjacent their upper ends and with a similar series of lugs adjacent their lower ends, a vertical connecting strip having upper and lower cross arms provided with sockets engaging said lugs, said strip having a terminal member exterior of the cell, the negative plates at the opposite ends of the cell having similarly arranged lugs and a similar connecting strip engaging the latter lugs, said strips extending continuously from the upper to the lower ends of the plates and constituting retaining and confining members for the plates.

3. In a storage battery, in combination with flat plates lying in vertical planes and arranged side by side, vertically extended electrically conductive retaining attachable members at opposite ends of the plates extending from a line above the upper edges of the plates and rigidly locked thereto adjacent the upper and lower borders of the plates and adapted to maintain the plates against buckling.

In witness whereof, I have hereunto set my hand and seal at Indianapolis this 24th day of September, A. D. nineteen hundred and seventeen.

JOHN M. AHLGREN. [L. S.]

Witnesses:
H. P. DOOLITTLE,
M. L. SHULER.